United States Patent
Ito et al.

(10) Patent No.: US 11,156,158 B2
(45) Date of Patent: Oct. 26, 2021

(54) COMBUSTION DEVICE AND GAS TURBINE ENGINE SYSTEM

(71) Applicant: IHI Corporation, Tokyo (JP)

(72) Inventors: Shintaro Ito, Tokyo (JP); Soichiro Kato, Tokyo (JP); Masahiro Uchida, Tokyo (JP); Shogo Onishi, Tokyo (JP); Taku Mizutani, Tokyo (JP); Tsukasa Saitou, Tokyo (JP); Toshiro Fujimori, Tokyo (JP)

(73) Assignee: IHI CORPORATION, Tokyo (JP)

( * ) Notice: Subject to any disclaimer, the term of this patent is extended or adjusted under 35 U.S.C. 154(b) by 37 days.

(21) Appl. No.: 16/535,870

(22) Filed: Aug. 8, 2019

(65) Prior Publication Data
US 2019/0360397 A1   Nov. 28, 2019

Related U.S. Application Data

(63) Continuation of application No. PCT/JP2018/011720, filed on Mar. 23, 2018.

(30) Foreign Application Priority Data

Mar. 27, 2017  (JP) .............................. JP2017-060961

(51) Int. Cl.
*F02C 3/24* (2006.01)
*B01D 53/94* (2006.01)
(Continued)

(52) U.S. Cl.
CPC ............ *F02C 3/24* (2013.01); *B01D 53/9418* (2013.01); *C01C 1/003* (2013.01); *F02C 7/143* (2013.01); *F02C 7/224* (2013.01); *F05D 2220/32* (2013.01)

(58) Field of Classification Search
CPC ............ B01D 53/8625; B01D 53/9148; B01D 2251/2062; B01D 2258/018; C01C 1/003; F02C 3/22; F02C 3/24; F02C 3/30; F02C 7/143; F02C 7/18; F02C 7/224; F02C 7/232; F02C 9/36; F02C 9/40; F05D 2260/213; F05D 2270/082; F23R 3/002; F23R 3/16; F23R 3/20; F23R 3/22; F23R 3/28; F23R 3/30; F23R 3/34; F23R 3/346; F23R 3/36; F23R 3/40; F23R 2900/00002; F01D 9/023; F01D 25/305
See application file for complete search history.

(56) References Cited

U.S. PATENT DOCUMENTS 4,896,499 A   1/1990  Rice
4,949,544 A * 8/1990  Hines ...................... F02C 7/143
                                                    60/728
(Continued)

FOREIGN PATENT DOCUMENTS

CN   102562310 A   7/2012
EP   2378096 A1   10/2011
(Continued)

*Primary Examiner* — Jason H Duger
(74) *Attorney, Agent, or Firm* — Rothwell, Figg, Ernst & Manbeck, P.C.

(57) ABSTRACT

A combustion device burns fuel ammonia in a combustion chamber using compressed combustion air, and includes a combustion air cooling unit which is configured to cool the combustion air by heat exchange with the fuel ammonia during or before a compression process.

4 Claims, 3 Drawing Sheets

(51) Int. Cl.
   *C01C 1/00*        (2006.01)
   *F02C 7/143*       (2006.01)
   *F02C 7/224*       (2006.01)

(56) References Cited

U.S. PATENT DOCUMENTS

| | | | |
|---|---|---|---|
| 6,378,284 B1 | 4/2002 | Utamura | |
| 2009/0133400 A1* | 5/2009 | Callas | F02C 7/143 60/730 |
| 2012/0036825 A1* | 2/2012 | Kasuga | F23R 3/286 60/39.52 |
| 2012/0047870 A1* | 3/2012 | Kasuga | F02C 7/22 60/39.462 |
| 2015/0000298 A1* | 1/2015 | McAlister | F02C 7/224 60/775 |

FOREIGN PATENT DOCUMENTS

| | | | |
|---|---|---|---|
| JP | H0255835 A | | 2/1990 |
| JP | 06-088538 A | | 3/1994 |
| JP | 09-236024 A | | 9/1997 |
| JP | 2877098 B2 | | 3/1999 |
| JP | 2980095 B2 | | 11/1999 |
| JP | 3567090 B2 | | 9/2004 |
| JP | 3937640 B2 | | 6/2007 |
| JP | 2015-190466 A | | 2/2015 |
| JP | 2015094496 A | * | 5/2015 |
| JP | 2016-191507 A | | 11/2016 |
| KR | 10-2016-0044235 A | | 4/2016 |
| WO | 2008/136119 A1 | | 11/2008 |
| WO | 2010/082360 A1 | | 7/2010 |
| WO | 2013/135691 A1 | | 9/2013 |

* cited by examiner

COMBUSTION DEVICE AND GAS TURBINE ENGINE SYSTEM

CROSS-REFERENCE TO RELATED APPLICATIONS

This application is a Continuation Application based on International Application No. PCT/JP2018/011720, filed Mar. 23, 2018, which claims priority on Japanese Patent Application No. 2017-060961, filed Mar. 27, 2017, the contents of which are incorporated herein by reference.

TECHNICAL FIELD

The present disclosure relates to a combustion device and a gas turbine engine system.

BACKGROUND

For example, Patent Document 1 discloses a configuration, in a device such as a gas turbine which is equipped with a compressor, in which a temperature of intake air supplied to the compressor is lowered by spraying liquid into the intake air. It is possible to improve efficiency of the entire system including the device equipped with the compressor by cooling the intake air to the compressor in this manner.

DOCUMENT OF RELATED ART

Patent Document

[Patent Document 1] Japanese Unexamined Patent Application, First Publication No. H9-236024

SUMMARY

In general, liquid sprayed into intake air is water. However, in regions where it is difficult to secure water, it is difficult to cool the intake air to a compressor by spraying water. In addition, even if water can be used, when the water is hard water containing calcium, scale may be generated inside the compressor or the like when the water is sprayed over a long period of time, and thus operation failure of the compressor may be caused. Therefore, even in regions where water can be secured, when hard water is generally used in the regions, high costs are required for water treatment, and therefore it is difficult to spray water into the intake air to the compressor.

On the other hand, in recent years, a combustion device for burning ammonia as a fuel has been proposed. In such a combustion device, ammonia stored as a liquid is vaporized and then supplied to a combustion chamber. Therefore, energy for vaporizing ammonia is required. However, the use of energy to vaporize ammonia hinders improvement of efficiency in the entire system including the combustion device.

The present disclosure has been made in view of the above-described problems, and an object thereof is to reduce an amount of water used to cool combustion air and to reduce an amount of energy used to vaporize fuel ammonia in a combustion device and a gas turbine engine system which burn the fuel ammonia as a fuel.

A combustion device according to an aspect of the present disclosure is a combustion device which burns fuel ammonia in a combustion chamber using compressed combustion air, and includes a combustion air cooling unit which is configured to cool the combustion air by heat exchange with the fuel ammonia during or before a compression process.

In the combustion device according to the aspect, the combustion device may further include: a low pressure compressor which is configured to compress the combustion air; and a high pressure compressor which is configured to further compress the combustion air compressed by the low pressure compressor, and the combustion air cooling unit may be an intercooler which is configured to cool the combustion air which is discharged from the low pressure compressor and is to be supplied to the high pressure compressor by heat exchange with the fuel ammonia.

In the combustion device according to the aspect, the intercooler may include: an ammonia cooling unit which is configured to cool the combustion air by heat exchange with the fuel ammonia; and a water cooling unit which is disposed on an upstream side of the ammonia cooling unit in a flow direction of the combustion air and is configured to cool the combustion air by heat exchange with water.

In the combustion device according to the aspect, the combustion air cooling unit may be configured to vaporize the liquefied fuel ammonia by heat exchange with the combustion air and to supply the vaporized fuel ammonia to the combustion chamber.

In the combustion device according to the aspect, the combustion device may further include a distribution mechanism which is configured to distribute a part of the fuel ammonia, which is to be supplied to the combustion chamber, to the combustion air cooling unit.

In the combustion device according to one aspect, the combustion device may further include a denitration device which is configured denitrate a combustion gas using a denitration catalyst and ammonia as a reducing agent, and at least a part of the fuel ammonia vaporized in the combustion air cooling unit may be supplied to the denitration device.

A gas turbine engine system according to an aspect of the present disclosure includes the combustion device.

According to the present disclosure, combustion air used for combustion of fuel ammonia in a combustion chamber is cooled by heat exchange with the fuel ammonia during or before a compression process. Therefore, in the present disclosure, an amount of water used to cool the combustion air can be reduced. Further, since the fuel ammonia is warmed by heat exchange with the combustion air, an amount of energy required to vaporize the fuel ammonia can be reduced. Therefore, according to the present disclosure, in a combustion device and a gas turbine engine system which burn the fuel ammonia as a fuel, it is possible to reduce the amount of water used to cool the combustion air and to reduce the amount of energy used to vaporize the fuel ammonia.

DESCRIPTION OF EMBODIMENTS

Hereinafter, an embodiment of a combustion device and a gas turbine engine system according to the present disclosure will be described with reference to the drawings.

Figure 1:
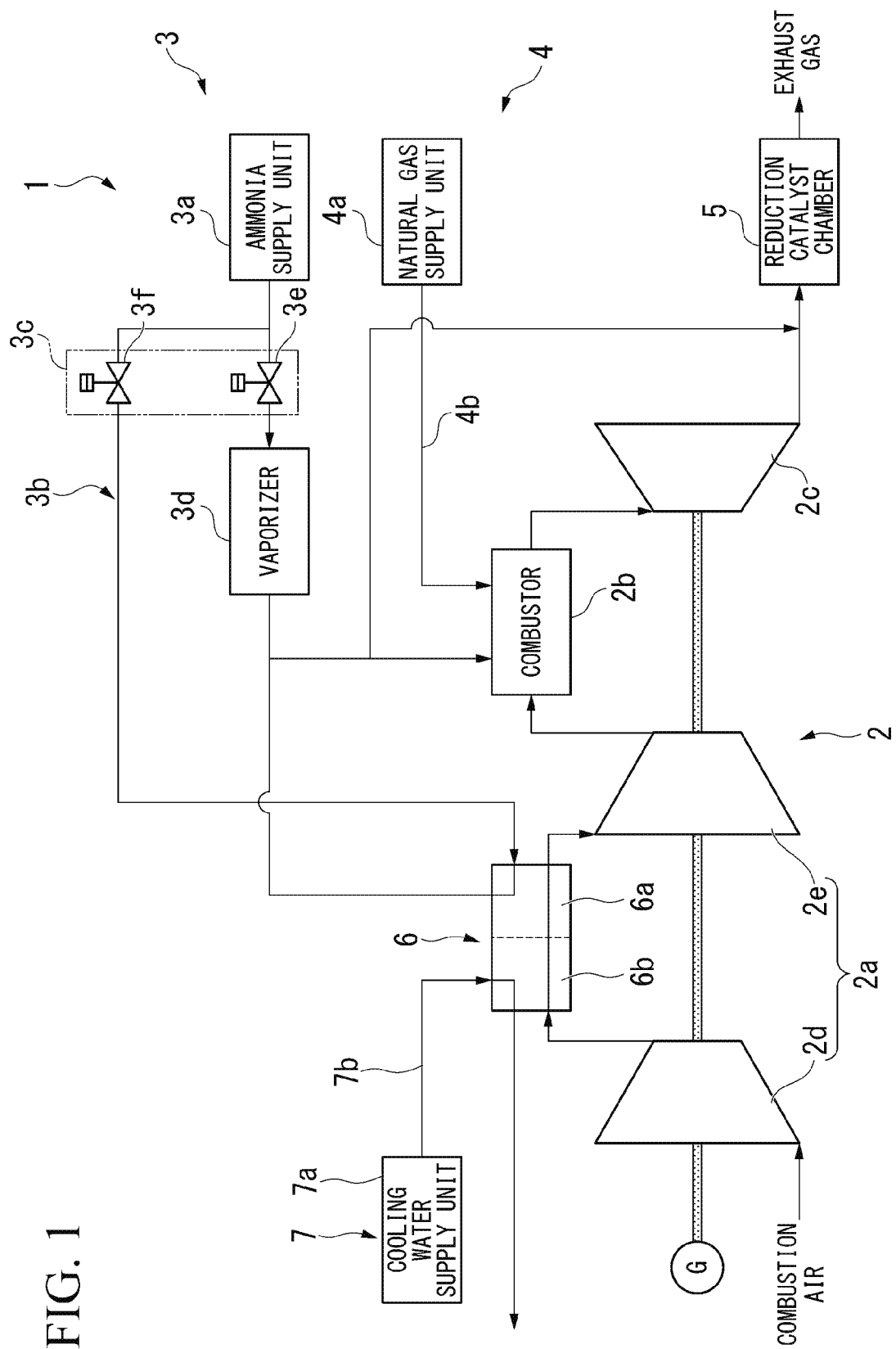
FIG. 1 is a block diagram showing an overall constitution of a gas turbine engine system according to an embodiment of the present disclosure.

FIG. 1 is a block diagram showing an overall constitution of a gas turbine engine system 1 according to the embodiment. As shown in the drawing, the gas turbine engine system 1 according to the embodiment includes a gas turbine engine 2, a fuel ammonia supply system 3, a natural gas supply system 4, a reduction catalyst chamber 5 (a denitration device), an intercooler 6 (a combustion air cooling unit), and a cooling water supply system 7. Further, in the embodiment, a compressor 2a of the gas turbine engine 2 which will be described later, the fuel ammonia supply system 3, the natural gas supply system 4, the intercooler 6 (the combustion air cooling unit), and the cooling water supply system 7 constitute a combustion device of the present disclosure. The gas turbine engine system 1 is a drive source of a generator G and generates rotational power by burning fuel ammonia using compressed combustion air.

The gas turbine engine 2 includes the compressor 2a, a combustor 2b (a combustion chamber), and a turbine 2c. The compressor 2a compresses combustion air taken from the outside to a predetermined pressure to generate compressed air. The compressor 2a includes a low pressure compressor 2d disposed upstream in a flow direction of the combustion air, and a high pressure compressor 2e disposed downstream in the flow direction of the combustion air. The low pressure compressor 2d compresses the combustion air prior to the high pressure compressor 2e, and the high pressure compressor 2e further compresses the combustion air compressed by the low pressure compressor 2d to obtain compressed air having a predetermined pressure. The compressor 2a supplies the generated compressed air to the combustor 2b.

In the combustor 2b (in the combustion chamber), the combustor 2b burns the vaporized fuel ammonia supplied from the fuel ammonia supply system 3 using the compressed air generated by the compressor 2a. The combustor 2b supplies a combustion gas obtained by such combustion to the turbine 2c. The turbine 2c generates rotational power using the combustion gas supplied from the combustor 2b as a driving gas. The turbine 2c is axially connected to the compressor 2a and the generator G and rotationally drives the compressor 2a and the generator G by its own rotational power. The turbine 2c exhausts the combustion gas after power recovery toward the reduction catalyst chamber 5.

The fuel ammonia supply system 3 includes an ammonia supply unit 3a, a pipe 3b, a distribution mechanism 3c, and a vaporizer 3d. The ammonia supply unit 3a includes a tank for storing the liquefied fuel ammonia and a pump for delivering the fuel ammonia stored in the tank, and delivers a predetermined amount of fuel ammonia toward the combustor 2b under control of a control device (not shown).

As shown in FIG. 1, the pipe 3b of the fuel ammonia supply system 3 is connected to the ammonia supply unit 3a and the combustor 2b, and includes a first path which guides the fuel ammonia to the combustor 2b via the vaporizer 3d, and a second path which guides the fuel ammonia to the combustor 2b via the intercooler 6 without passing through the vaporizer 3d. Further, the pipe 3b also includes a third path which branches from the first path which guides the fuel ammonia to the combustor 2b via the vaporizer 3d, and guides the fuel ammonia to an exhaust gas pipe located on the upstream side of the reduction catalyst chamber 5.

The distribution mechanism 3c includes a first valve 3e and a second valve 3f. The first valve 3e is disposed at a midway portion of the first path of the pipe 3b which guides the fuel ammonia to the combustor 2b via the vaporizer 3d, and is disposed on the upstream side of the vaporizer 3d. An opening degree of the first valve 3e is adjusted by the control device (not shown), and thereby an amount of supply of the fuel ammonia delivered from the ammonia supply unit 3a to the vaporizer 3d is adjusted. The second valve 3f is disposed at a midway portion of the second path of the pipe 3b which guides the fuel ammonia to the combustor 2b via the intercooler 6 without passing through the vaporizer 3d. An opening degree of the second valve 3f is adjusted by the control device (not shown), and thereby an amount of supply of the fuel ammonia delivered from the ammonia supply unit 3a to the intercooler 6 is adjusted. The distribution mechanism 3c distributes part of the fuel ammonia, which is to be supplied to the combustor 2b, to the intercooler 6 in accordance with the opening degree of the first valve 3e and the second valve 3f.

The vaporizer 3d vaporizes the liquefied fuel ammonia supplied from the ammonia supply unit 3a via the first valve 3e and generates gaseous fuel ammonia. The fuel ammonia generated by the vaporizer 3d is supplied to the combustor 2b, and part of the fuel ammonia is supplied to the reduction catalyst chamber 5 via the pipe 3b.

The natural gas supply system 4 includes a natural gas supply unit 4a and a pipe 4b. The natural gas supply unit 4a includes a tank which stores liquefied natural gas, a pump which delivers the liquefied natural gas stored in the tank, and a vaporizer which vaporizes the liquefied natural gas. The natural gas supply unit 4a delivers a predetermined amount of natural gas toward the combustor 2b under control of the control device (not shown). The pipe 4b is connected to the natural gas supply unit 4a and the combustor 2b and guides the natural gas delivered from the natural gas supply unit 4a to the combustor 2b.

The reduction catalyst chamber 5 is filled with a reduction catalyst, and nitrogen oxides (NOx) contained in the combustion gas are reduced to nitrogen ($N_2$) by performing reduction treatment on the nitrogen oxides (NOx). The reduction catalyst chamber 5 performs reduction treatment (denitration treatment) on the nitrogen oxides (NOx) using cooperation between the reduction catalyst (denitration catalyst) stored in the reduction catalyst chamber 5 and the fuel ammonia as a reducing agent supplied via the pipe 3b of the fuel ammonia supply system 3. Note that the fuel ammonia supplied to the reduction catalyst chamber 5 is not used as a fuel but is consumed as ammonia for reduction.

The intercooler 6 is disposed between the low pressure compressor 2d and the high pressure compressor 2e, cools the combustion air compressed by the low pressure compressor 2d and supplies the cooled combustion air to the high pressure compressor 2e. The intercooler 6 is connected to the second path of the pipe 3b provided in the fuel ammonia supply system 3 for guiding the fuel ammonia to the combustor 2b without passing through the vaporizer 3d. The intercooler 6 cools the combustion air by indirect heat exchange between the fuel ammonia flowing through the pipe 3b of the fuel ammonia supply system 3 and the combustion air, and also heats and vaporizes the fuel ammonia. Further, the intercooler 6 is connected to a pipe 7b of the cooling water supply system 7 which will be described later. The intercooler 6 cools the combustion air by indirect heat exchange between the cooling water flowing through the pipe 7b of the cooling water supply system 7 and the combustion air.

The intercooler 6 includes an ammonia cooling unit 6a which cools the combustion air using the fuel ammonia and a water cooling unit 6b which cools the combustion air using the cooling water. In the flow direction of the combustion air, the water cooling unit 6b is disposed on the upstream side, and the ammonia cooling unit 6a is disposed on the downstream side. That is, in the embodiment, the combustion air discharged from the low pressure compressor $2d$ is first cooled using cooling water and then cooled using the fuel ammonia. In general, the fuel ammonia supplied to the combustor $2b$ is pressurized to several MPa but has a boiling point lower than that of water even in a pressurized state. For example, when the fuel ammonia is pressurized to 2 MPa, the boiling point is about 70° C. Therefore, the combustion air can be cooled to a lower temperature by first performing the cooling with cooling water and then performing the cooling with the fuel ammonia.

The cooling water supply system 7 includes a cooling water supply unit $7a$ and a pipe $7b$. The cooling water supply unit $7a$ includes a tank which stores the cooling water, a pump which delivers the cooling water stored in the tank, and so on. The cooling water supply system 7 delivers a predetermined amount of cooling water toward the intercooler 6 under control of the control device (not shown). The pipe $7b$ is disposed through the intercooler 6 and guides the cooling water delivered from the cooling water supply unit $7a$ via the intercooler 6.

An example of operation of the gas turbine engine system 1 of the embodiment will be described.

For example, when the gas turbine engine system 1 starts from a stopped state, the natural gas is supplied from the natural gas supply system 4 to the combustor $2b$. The natural gas supplied to the combustor $2b$ is mixed with air in the combustor $2b$ and burned by being ignited by an ignition device (not shown). When the combustion gas generated by the combustion of the natural gas is supplied to the turbine $2c$, rotational power is generated, and the compressor $2a$ is driven. When the compressor $2a$ is driven, compressed air is generated in the compressor $2a$. The compressed air is supplied to the combustor $2b$, and thus the combustion in the combustor $2b$ is promoted. Thus, the gas turbine engine system 1 starts. The gas turbine engine system 1 may start by supplying the fuel ammonia to the combustor $2b$ from the fuel ammonia supply system 3 through the vaporizer $3d$ instead of or together with the natural gas.

When the gas turbine engine system 1 starts, a necessary amount of fuel ammonia is supplied to the combustor $2b$ from the fuel ammonia supply system 3, instead of natural gas or together with the natural gas, under the control of the control device (not shown). Some of the liquefied fuel ammonia delivered from the ammonia supply unit $3a$ is vaporized through the intercooler 6 and then supplied to the combustor $2b$. The remaining liquefied fuel ammonia delivered from the ammonia supply unit $3a$ is vaporized by the vaporizer $3d$ and then supplied to the combustor $2b$. The fuel ammonia supplied to the combustor $2b$ burns with the compressed air. Then, the combustion gas generated by the combustion of the fuel ammonia is supplied to the turbine $2c$, and the turbine $2c$ generates the rotational power for driving the compressor $2a$ and the generator G. The combustion gas is reduced by the reduction catalyst chamber 5 after energy is recovered by the turbine $2c$ and then exhausted.

Further, the combustion air compressed by the low pressure compressor $2d$ of the compressor $2a$ is cooled by the intercooler 6 and then supplied to the high pressure compressor $2e$. At this time, the combustion air is first cooled in the intercooler 6 by indirect heat exchange with the cooling water and then cooled by indirect heat exchange with the fuel ammonia.

In the gas turbine engine system 1 of the embodiment as described above, the combustion air used for the combustion of the fuel ammonia in the combustor $2b$ is cooled by heat exchange with the fuel ammonia during a compression process. Therefore, in the gas turbine engine system 1 of the embodiment, an amount of water used to cool the combustion air can be reduced. Further, since the fuel ammonia is heated by heat exchange with the combustion air, the amount of energy used to vaporize the fuel ammonia can be reduced.

Further, the gas turbine engine system 1 of the embodiment includes the low pressure compressor $2d$ which first compresses the combustion air, and the high pressure compressor $2e$ which further compresses the combustion air compressed by the low pressure compressor $2d$ and includes, as a combustion air cooling unit, the intercooler 6 which cools the combustion air which is discharged from the low pressure compressor $2d$ and is to be supplied to the high pressure compressor $2e$ by heat exchange with the fuel ammonia. According to the gas turbine engine system 1 of the embodiment, since the dedicated combustion air cooling unit is provided separately from the gas turbine engine 2, it is possible to enhance a cooling capacity of the combustion air.

Further, in the gas turbine engine system 1 of the embodiment, the intercooler 6 includes the ammonia cooling unit $6a$ which cools the combustion air by heat exchange with the fuel ammonia, and the water cooling unit $6b$ which is disposed on the upstream side of the ammonia cooling unit $6a$ in the flow direction of the combustion air and cools the combustion air by heat exchange with water. According to the gas turbine engine system 1 of the embodiment, since the combustion air, which has been cooled using the cooling water, is cooled using the liquefied ammonia having a boiling point lower than that of the cooling water, the combustion air can be cooled to a lower temperature, and the overall system efficiency of the gas turbine engine system 1 can be further enhanced.

Further, in the gas turbine engine system 1 of the embodiment, a constitution in which the cooling water supply system 7 is not installed may be adopted. In such a case, the combustion air is cooled only by the fuel ammonia in the intercooler 6.

Further, in the gas turbine engine system 1 of the embodiment, the intercooler 6 vaporizes the liquefied fuel ammonia by the heat exchange with the combustion air and supplies the vaporized fuel ammonia to the combustion chamber. It may be possible to cool the combustion air by heat exchange between the vaporized fuel ammonia and the combustion air. However, when the heat exchange between the liquefied fuel ammonia and the combustion air is performed, it is possible to cool the combustion air using latent heat of the liquefied ammonia, and thus the overall system efficiency of the gas turbine engine system 1 can be improved.

Further, the gas turbine engine system 1 of the embodiment includes the distribution mechanism $3c$ which distributes part of the fuel ammonia, which is to be supplied to the combustor $2b$, to the intercooler 6. Therefore, the amount of fuel ammonia supplied to the intercooler 6 can be adjusted. Thus, according to the gas turbine engine system 1 of the embodiment, the cooling capacity of the intercooler 6 can be adjusted.

Although a preferred embodiment of the present disclosure has been described above with reference to the accompanying drawings, it goes without saying that the present disclosure is not limited to the above-described embodiment. The shapes, combinations, and the like of the elements shown in the above-described embodiment are merely examples, and various changes can be made based on design requirements and the like without departing from the spirit of the present disclosure.

Figure 2:
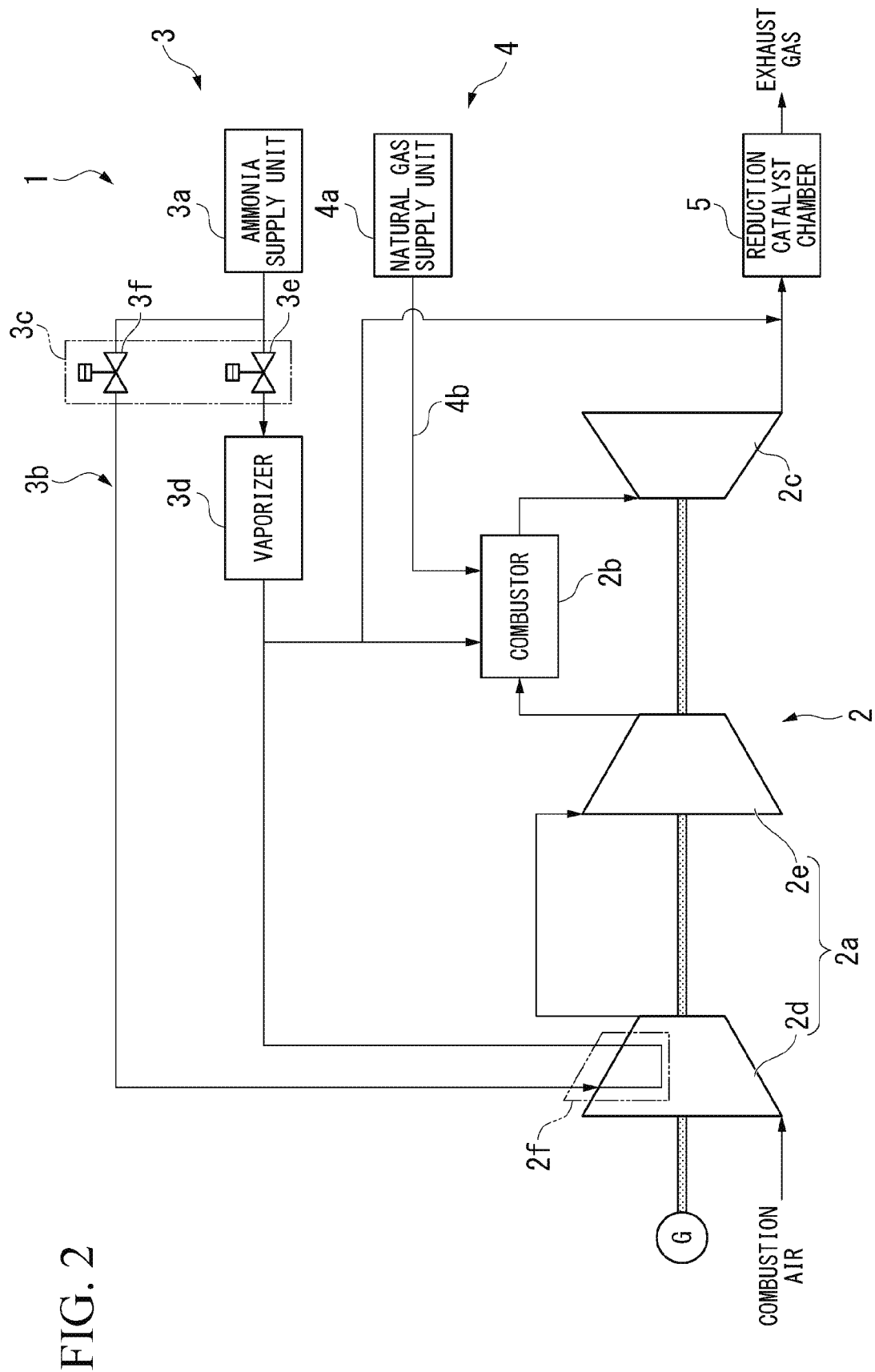
FIG. 2 is a block diagram showing an overall constitution of a modified example of the gas turbine engine system according to the embodiment of the present disclosure.

For example, in the above-described embodiment, the constitution in which the intercooler 6 is installed outside the gas turbine engine 2 and the combustion air is cooled by the intercooler 6 has been described. However, the present disclosure is not limited thereto. For example, as shown in FIG. 2, a heat exchange unit 2f (a combustion air cooling unit) which cools the combustion air by heat exchange between the combustion air and the fuel ammonia during the compression process may be provided inside the low pressure compressor 2d. For example, a flow path through which the fuel ammonia flows may be formed inside a stationary blade of the low pressure compressor 2d, and a region in which the flow path is formed may be used as the heat exchange unit 2f. According to such a modified example, since it is not necessary to install the intercooler 6 outside the gas turbine engine 2, it is possible to miniaturize the gas turbine engine system 1.

Further, in the above-described embodiment, the constitution in which the combustion air is cooled by the intercooler 6 during the compression process has been described. However, the present disclosure is not limited thereto.

Figure 3:
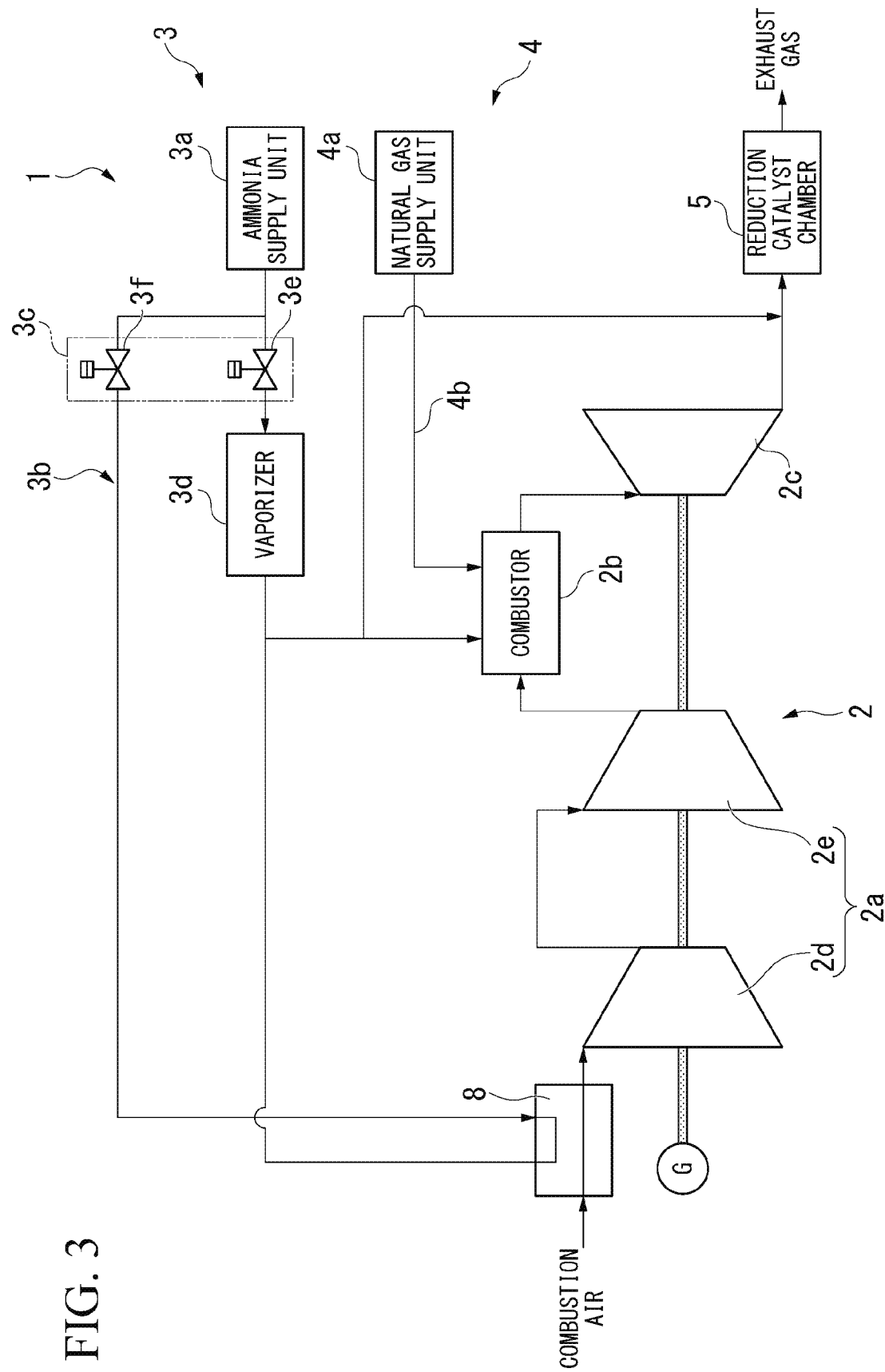
FIG. 3 is a block diagram showing an overall constitution of another modified example of the gas turbine engine system according to the embodiment of the present disclosure.

For example, as shown in FIG. 3, a constitution in which a heat exchanger 8 (a combustion air cooling unit) for heat exchange between the combustion air before being supplied to the compressor 2a and the fuel ammonia is installed to cool the combustion air before compression may be adopted.

Further, in the above-described embodiment, the example in which the combustion device of the present disclosure is applied to the gas turbine engine system 1 has been described. However, the combustion device of the present disclosure is not applicable only to the gas turbine engine system 1. For example, as long as a system includes a combustion system which mixes the compressed air with the fuel ammonia and burns it, the combustion system of the present disclosure is applicable.

Further, in the above-described embodiment, all of fuel ammonia delivered from the ammonia supply unit 3a may be supplied to the intercooler 6 without using the distribution mechanism 3c. In this case, it is preferable to install a vaporizer at the downstream side of the intercooler 6 so that the fuel ammonia which has passed through the intercooler 6 is reliably vaporized and then supplied to the combustor 2b.

Further, in the above-described embodiment, the constitution in which the gas turbine engine system 1 includes the natural gas supply system 4 has been described. However, the present disclosure is not limited thereto. As long as the vaporizer 3d is provided, a constitution in which the natural gas supply system 4 is not provided may be adopted.

Further, in the above-described embodiment, the constitution in which not only the fuel ammonia but also the natural gas can be supplied to the combustor 2b has been described. However, the present disclosure is not limited thereto, and hydrocarbons other than natural gas or other fuels may be used instead of natural gas of the above-described embodiment.

According to the present disclosure, in a combustion device and a gas turbine engine system which burn fuel ammonia as a fuel, it is possible to reduce an amount of water used to cool combustion air and to reduce the amount of energy used to vaporize the fuel ammonia.

What is claimed is:

1. A combustion device comprising:
    a vaporizer;
    an ammonia supply unit configured to provide fuel ammonia the ammonia supply unit configured to supply a first part of the fuel ammonia to the vaporizer and configured to supply a second part of the fuel ammonia such that it bypasses the vaporizer;
    a low pressure compressor which is configured to compress combustion air;
    a high pressure compressor which is configured to further compress the combustion air compressed by the low pressure compressor;
    a combustion chamber in which the first and the second part of the fuel ammonia is burned using the combustion air compressed by the low pressure compressor and the high pressure compressor; and
    a combustion air cooling unit which is configured to cool the combustion air after being supplied to the low pressure compressor and before being supplied to the high pressure compressor by heat exchange with the second part of the fuel ammonia during a compression process,
    wherein a flow path through which the second part of the fuel ammonia flows is formed inside a stationary blade of the low pressure compressor, the flow path inside the stationary blade of the low pressure compressor being separate from a flow path of the combustion air through the low pressure compressor, and
    a region in which the flow path inside the stationary blade is formed is used as the combustion air cooling unit, and the combustion air cooling unit is configured to cool the combustion air by indirect heat exchange between the second part of the fuel ammonia flowing through the flow path inside the stationary blade and the combustion air flowing through the flow path of the combustion air through the low pressure compressor,
    wherein the first part of the fuel ammonia and the second part of the fuel ammonia are configured to be combined prior to being burned in the combustion chamber and after the first part of the fuel ammonia passes through the vaporizer and after the second part of the fuel ammonia passes through the combustion air cooling unit.

2. The combustion device according to claim 1, further comprising:
    a tank of the ammonia supply unit in which the fuel ammonia is stored;
    a first path which connects the ammonia supply unit and the combustion chamber to each other;
    a second path which is different from the first path and connects the ammonia supply unit and the combustion chamber to each other via the combustion air cooling unit; and
    a distribution mechanism which includes a first valve provided in the first path and configured to adjust an amount of supply of the first part of the fuel ammonia passing through the first path and a second valve provided in the second path and configured to adjust an amount of supply of the second part of the fuel ammonia passing through the second path.

3. The combustion device according to claim 1, further comprising a denitration device which is filled with a denitration catalyst and is configured denitrate a combustion gas using the denitration catalyst and ammonia as a reducing agent.

4. A gas turbine engine system comprising the combustion device according to claim 1.

* * * * *